United States Patent
Evoy

[11] Patent Number: 6,044,412
[45] Date of Patent: Mar. 28, 2000

[54] INTEGRATED CIRCUIT PIN SHARING METHOD AND APPARATUS FOR DIVERSE MEMORY DEVICES BY MULTIPLEXING SUBSETS OF PINS IN ACCORDANCE WITH OPERATION MODES

[75] Inventor: David Ross Evoy, Tempe, Ariz.

[73] Assignee: VLSI Technology, Inc., San Jose, Calif.

[21] Appl. No.: 08/955,261

[22] Filed: Oct. 21, 1997

[51] Int. Cl.[7] .............................. G06F 13/16; G06F 13/36
[52] U.S. Cl. .............................. 710/14; 710/38; 710/126; 710/131
[58] Field of Search ................................ 395/311, 297, 395/304; 710/10, 14, 38, 126, 131

[56] References Cited

U.S. PATENT DOCUMENTS

| | | | |
|---|---|---|---|
| 4,144,562 | 3/1979 | Cooper | 710/127 |
| 5,402,014 | 3/1995 | Ziklik et al. | 326/37 |
| 5,426,739 | 6/1995 | Lin et al. | 710/129 |
| 5,557,757 | 9/1996 | Gephardt et al. | 710/126 |
| 5,787,299 | 7/1998 | Ostler et al. | 712/39 |
| 5,790,884 | 8/1998 | Weinman et al. | 710/4 |
| 5,793,990 | 8/1998 | Jirgal et al. | 710/107 |
| 5,822,547 | 10/1998 | Boesch et al. | 710/103 |
| 5,857,117 | 1/1999 | Abramson et al. | 395/885 |

FOREIGN PATENT DOCUMENTS 229288   9/1994   China .
99/15971   4/1999   WIPO .

Primary Examiner—Thomas C. Lee
Assistant Examiner—Ilwoo Park
Attorney, Agent, or Firm—Burns Doane Swecker & Mathis L.L.P.

[57] ABSTRACT

The present invention, generally speaking, provides for pin sharing between two or more disparate memory devices, a dynamic memory device such as a CD ROM drive or the like and a static memory device such as a ROM integrated circuit. In accordance with one embodiment of the invention, a common set of pins of an integrated circuit are used to interface to a plurality of different information storage device including both a dynamic storage device and static storage device by, in a first mode, using a first subset of the common set of pins to carry data information for one of the devices and, in a second mode, using the first subset of pins to carry address information for another one of the devices. In accordance with another embodiment of the invention, an integrated circuit includes a set of I/O pins, a multiplexer coupled to the set of I/O pins, and multiple device controllers coupled to the multiplexer, including both a dynamic storage device controller and a static storage device controller. Control circuitry is provided for, in a first mode, coupling a first one the device controllers through the multiplexer to the set of I/O pins and for, in a second mode, coupling a second one of the device controllers through the multiplexer to the set of I/O pins.

10 Claims, 2 Drawing Sheets

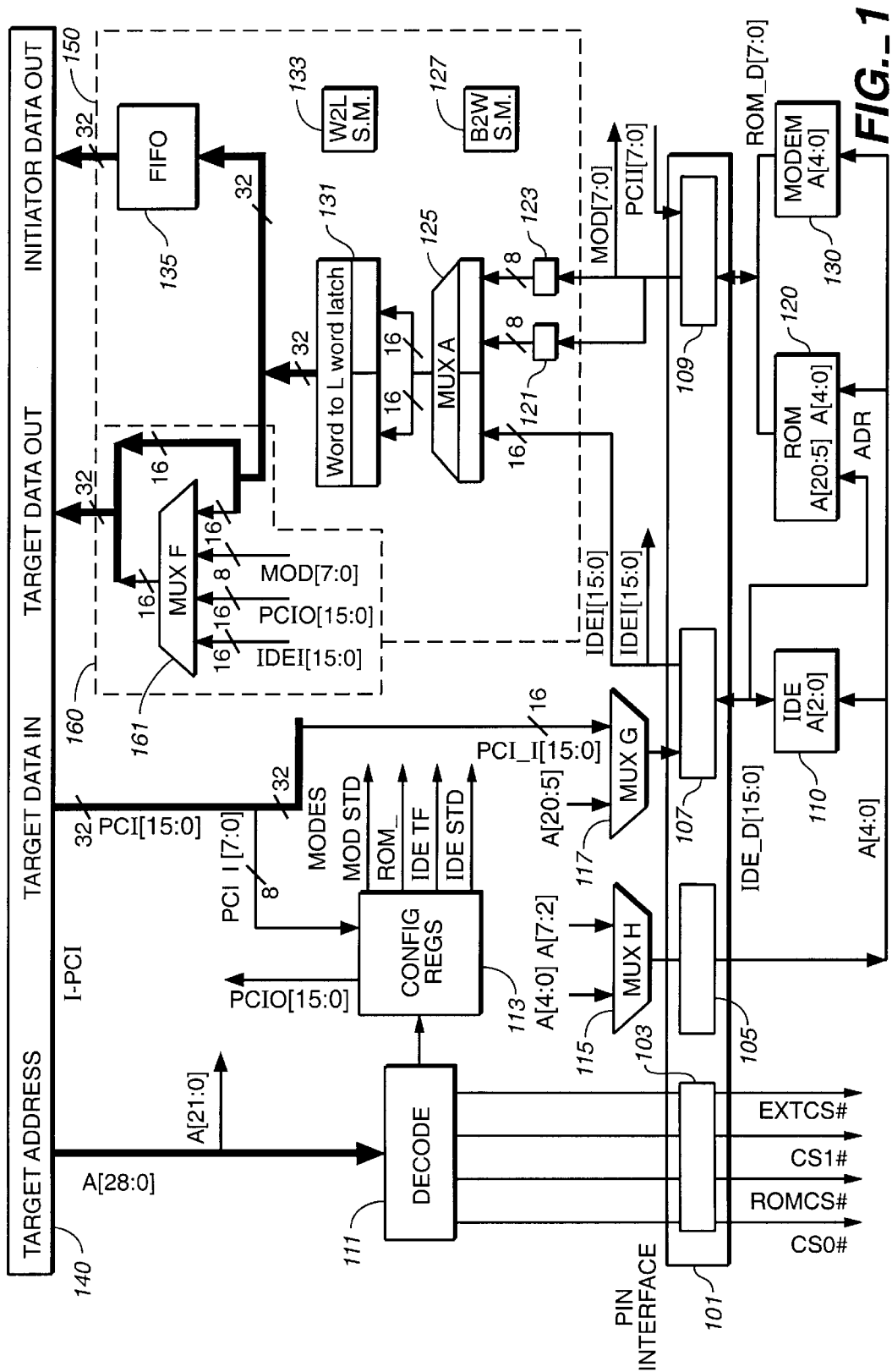

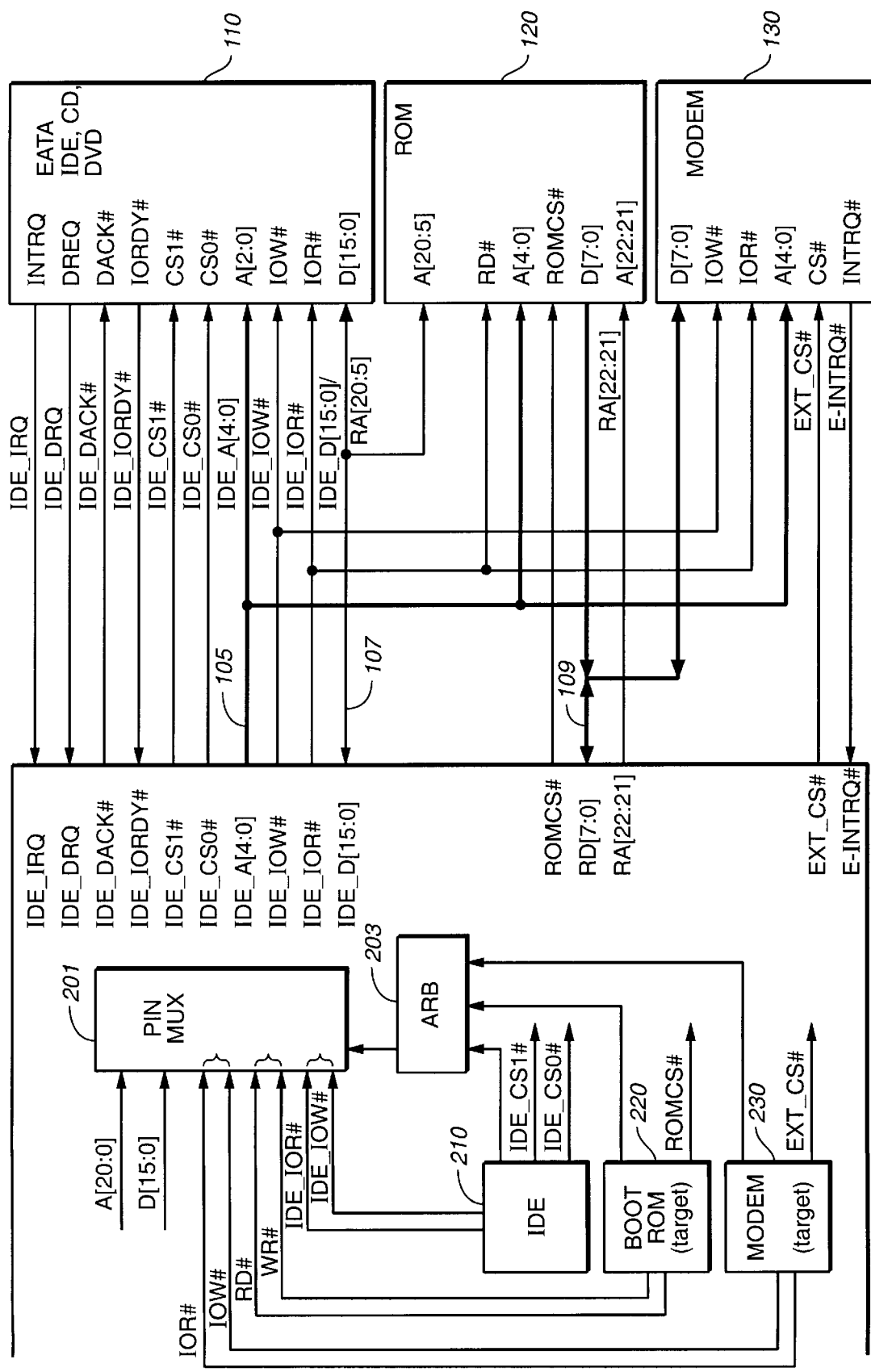
FIG._2

6,044,412

INTEGRATED CIRCUIT PIN SHARING METHOD AND APPARATUS FOR DIVERSE MEMORY DEVICES BY MULTIPLEXING SUBSETS OF PINS IN ACCORDANCE WITH OPERATION MODES

BACKGROUND OF THE INVENTION

1. Field of the Invention

The present invention relates to integrated circuits and pin count reduction.

2. State of the Art

As the integration density of integrated circuits increases, designs have increasingly become pin-count limited. That is, the features to be included in the chip are limited by the number of I/O pins of the final chip package. Furthermore, the cost of the chip package in proportion to the total cost of the typical integrated circuit continues to increase. In many instances, the cost of the final integrated circuit is dominated by the cost of the package. For high-volume integrated circuits, a relatively small savings per part in the cost of the package can result in a substantial overall cost savings. Hence, design efforts to reduce pin count so as to allow a lower-cost package to be used instead of a higher-cost package are of considerable importance.

Consumer electronics devices are high volume and very cost-sensitive. An example of one such device is a game player. A game player may have diverse memory devices such as a boot ROM (Read Only Memory) and a CD ROM drive, DVD drive, or the like. A system controller for such a device must interface to both types of memory devices. CD ROM drives and the like are typically IDE (Integrated Device Electronics) devices conforming to the IDE standard. Whereas ROMs typically reside on the same printed circuit board as the system controller, IDE drives are connected to the printed circuit board using a cable. Pin sharing between the memory devices is problematic in that if the devices are connected to the same pins, the ROM will have insufficient drive strength to drive the pins.

Furthermore, the pin requirements of the devices are substantially different. An IDE device has a wide data bus (e.g., 16 bits) and a narrow address bus (e.g., 3 bits). A ROM, on the other hand, has a narrow data bus (e.g, 8 bits) and a wide address bus (e.g., 16 bits). The disparate nature of these memory devices therefore renders pin sharing extremely difficult.

SUMMARY OF THE INVENTION

The present invention, generally speaking, provides for pin sharing between two or more disparate memory devices, a dynamic memory device such as a CD ROM drive or the like and a static memory device such as a ROM integrated circuit. In accordance with one embodiment of the invention, a common set of pins of an integrated circuit are used to interface to a plurality of different information storage device including both a dynamic storage device and static storage device by, in a first mode, using a first subset of the common set of pins to carry data information for one of the devices and, in a second mode, using the first subset of pins to carry address information for another one of the devices. In accordance with another embodiment of the invention, an integrated circuit includes a set of I/O pins, a multiplexer coupled to the set of I/O pins, and multiple device controllers coupled to the multiplexer, including both a dynamic storage device controller and a static storage device controller. Control circuitry is provided for, in a first mode, coupling a first one the device controllers through the multiplexer to the set of I/O pins and for, in a second mode, coupling a second one of the device controllers through the multiplexer to the set of I/O pins.

BRIEF DESCRIPTION OF THE DRAWING

The present invention may be further understood from the following description in conjunction with the appended drawing. In the drawing:

FIG. 1 is a block diagram of a system controller in which the present invention may be used; and FIG. 2 is another block diagram of the system controller of FIG. 1 showing pin assignments in greater detail.

DETAILED DESCRIPTION OF THE PREFERRED EMBODIMENTS

Referring now to FIG. 1, there is shown a block diagram of an exemplary system controller in which the present invention may be used. The system controller is realized in the form of an integrated circuit having a pin interface with a number of I/O pins. Different subsets (103, 105, 107, 109) of logically related pins are indicated. In the exemplary embodiment, the system controller interfaces to an IDE device 110 and a ROM 120, and may also interface to an optional modem 130. Normally, because of the disparate nature of the IDE device and the ROM, interfacing to the ROM would increase the required pin count of the part by about 40 pins more than would be required without the ROM, thereby necessitating an expensive package. Using the teachings of the present invention, the number of pins required by the ROM may be reduced to only 14, thereby allowing a relatively inexpensive package to be used.

Referring still to FIG. 1, a subset of pins 101 includes separate chip select pins for each of the external devices, including a ROM chip select (ROMCS#), a modem chip select (EXTCS#) and two IDE chip selects (CS0# and CS1#). The chip selects are produced by an address decoder 111 coupled to a target address portion of the I-PCI bus 140. The I-PCI bus provides for high data throughput within the system controller chip. The I-PCI bus 140 is an internal bus that is similar to the industry standard PCI bus, but has been modified (in this example) for use internal to a complex integrated circuit. The decoder 111 also selects configuration registers 113 of the system controller chip for reading and writing. By writing appropriate information in to the configuration registers, different modes may be selected including a modem mode, a ROM mode, a standard IDE mode (IDE STD) that uses DMA and a non-DMA IDE mode (IDE TF) to allow access to the test file registers within the IDE drive.

A subset of pins 107 (16 pins in the illustrated embodiment) provides data information to the IDE device 110 in IDE mode and provides address information to the ROM 120 in ROM mode. In FIG. 1, the data busses of the external devices are represented at the upper edges of the corresponding blocks, and data busses of the external devices are represented at the lower edges of the corresponding blocks. A subset of pins 109 provides data information from the ROM 120 in ROM mode and to and from the modem 130 in modem mode. Finally, a subset of pins 103 provides address information to each of the respective devices (110, 120, 130) in their respective modes. This address information is provided through a multiplexer 115 and may come from either address bits [5:0] of the PCI bus or address bits [7:2] of the PCI bus depending on the mode selected by block 113.

The subset of pins 107 performs three functions: 1) ROM address output; 2) IDE data output; and 3) IDE data input. For function number 1, the ROM chip select is asserted, a multiplexer 117 is controlled to select address bits [21:6], and the pins are driven as outputs. For function number 2, the appropriate IDE chip select is asserted, the multiplexer 117 is controlled to select PCI data input pins PCI_I[15:0], and the pins are driven as outputs. For function number 3, the appropriate IDE chip select is asserted and the pins are driven as inputs to the chip. Data from the IDE device, IDEI[15:0] is input to both of two parallel data paths, a DMA data path 150 and a non-DMA data path 160.

In ROM mode and modem mode, the DMA data path 150 converts byte data to word data (elements 121, 123, 125) under control of a B2W state machine 127 and then converts the resulting word data to longword data (element 131) under control of a W2L 133 state machine. In IDE mode, the DMA data path converts word data to longword data. In both modes, longword data is queued within a FIFO 135 for output to the PCI bus and is also input to the non-DMA data path 160. The FIFO/OMA paths are used to transfer data from the IDE drive direct to memory. The non-DMA path is intended primarily for code and data fetches from the ROM. These accesses are not always sequential and cannot always be performed by DMA. This circuit does support DMA movement of ROM data or single word access of IDE data, but this is not normal access.

The non-DMA data path 160 selects (through multiplexer 161) word data from the IDE device 110, the configuration registers 113, or a long word (32 bits) the DMA data path 150 or selects byte data from the modem 130. This allows the host system to access each device appropriately.

The subset of pins 109 also performs three functions: 1) data input from the ROM 120; 2) data input from the modem 130; and 3) data output to the modem 130. For function number 1, the ROM chip select is asserted and the pins are driven as inputs. For function number 2, the modem chip select is asserted and the pins are driven as inputs. For function number 3, the modem chip select is asserted and the pins are driven as outputs.

Referring to FIG. 2, the pin assignments described generally in relation to FIG. 1 are shown in greater detail. A pin multiplexer 201 receives address bits A[21:0] and data bits D[15:0] from the PCI bus of FIG. 1. The pin multiplexer 201 includes multiplexers 115 and 117 in FIG. 1, together with additional logic not shown in FIG. 1. Control of the pin multiplexer 201 is performed by arbitration logic 203. The arbitration logic 203 receives request signals from multiple device controllers including, in the present example, an IDE controller 210, a ROM controller 220 and a modem controller 230. The IDE controller 210 may perform target accesses or initiator accesses in accordance with the PCI specification. The ROM and modem controllers (220, 230) may perform target accesses only.

The arbitration logic 201 ensures that conflict between the devices in relation to the shared pins is avoided. If only a ROM and IDE device are present, the arbitration logic 201 may operate such that the shared pins are initially reserved for use of the ROM 120 during boot and thereafter are reserved for use of the IDE device 110. Alternatively, both the ROM 120 and the IDE device 110 may continue to operate following boot, with the arbitration logic 201 determining which device controller and which corresponding device are given control of the shared pins at any given time.

The respective device controllers (210, 220, 230) each generate chip select signals for the respective devices and read/write signals for the respective devices. The chip select signals connect directly to dedicated pins. The read/write signals, like the address and data signals, are multiplexed and are therefore input to the pin multiplexer 201. The IDE controller 210 generates a number of additional control signals as shown in FIG. 2. For convenience, the actual connection of these control signals to the IDE controller 210 is not shown.

The subsets of pins identified in FIG. 1 are identified by the same reference numerals in FIG. 2. The manner in which the ROM, IDE and modem interfaces are multiplexed onto common pins may be represented in tabular form as follows:

TABLE 1

| Pin Name | IDE IO function | IDE DMA function | ROM function | Modem function |
|---|---|---|---|---|
| IDE_D[15:0]/RA[20:5] | Data [15:0] | Data [15:0] | A[20:5] | None |
| IDE_CS0# | Select for task file, 'IO' data | N/A, (high) | N/A, (high) | N/A, (high) |
| IDE_CS1# | Select for alt file, register | N/A, (high) | N/A, (high) | N/A, (high) |
| IDE_A[2:0]/RA[4:0] | IDE A[2:0] | N/A, (xs) | A[4:0] | A[4:0] |
| IDE_IOR# | IOR# | IOR# | IOR# | IOR# |
| IDE_IOW# | IOW# | IOW# | WR# | IOW# |
| IDE_DRQ | N/A | DACK# | N/A | N/A |
| IDE_DACK# | IDEIRQ | N/A | N/A | N/A |
| IDEIRQ | N/A | N/A | N/A | N/A |
| ROMCS# | N/A | N/A | ROMCS | N/A |
| RA[22:21] | N/A | N/A | A[22:21] | N/A |
| RD[7:0] | N/A | N/A | D[7:0] | D[7:0] |
| EXT_CS# | N/A | N/A | N/A | CS# |
| EXT_INT# | N/A | N/A | N/A | INTRQ# |

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of using a common set of pins of an integrated circuit to interface to a plurality of different information storage devices including both a dynamic storage device and a static storage device, the method comprising the steps of:

in a first mode, using a first subset of pins of said common set of pins to carry data information for one of said devices and a second subset of pins to carry address information for said one of said devices;

in a second mode, using said first subset of pins to carry address information for another one of said devices; and in said second mode, using a third subset of pins wholly distinct from said first and second subsets of pins to carry data information from said another one of said devices.

2. The method of claim 1, wherein said plurality of devices includes an IDE device and a ROM.

3. The method of claim 2, wherein in said first mode, said first subset of pins is used to exchange data information with said IDE device.

4. The method of claim 3, wherein in said second mode, said first subset of pins is used to carry address information to said ROM.

5. The method of claim 4, wherein said plurality of devices further includes a modem.

6. The method of claim 5, comprising the further steps of, in a third mode, using said second subset of pins to exchange data with said modem.

7. Apparatus comprising:

an integrated circuit comprising:
  I/O pins;
  a multiplexer coupled to a set of said I/O pins;
  a plurality of device controllers coupled to said multiplexer, including both a dynamic storage device controller and a static storage device controller;
  a plurality of devices including both a dynamic storage device and a static storage device coupled to said set of I/O pins;
  control circuitry for, in a first mode, coupling a first one of said device controllers through said multiplexer to said set of I/O pins and for, in a second mode, coupling a second one of said device controllers through said multiplexer to said set of I/O pins;
  lines coupling to a first subset of said set of I/O pins both data signals of a first one of said devices and address signals of a second one of said devices;
  lines coupling to a second subset of pins address signals for said one of said devices; and
  lines coupling to a third subset I/O pins, wholly distinct from said first and second subsets of I/O pins, data signals of said second one of said devices.

8. The apparatus of claim 7, wherein said plurality of devices includes an IDE device and a ROM.

9. The apparatus of claim 8, wherein said plurality of devices further includes a modem.

10. The apparatus of claim 9, further comprising lines coupling to said second subset of I/O pins data signals of said modem.

* * * * *